United States Patent
Farey et al.

(10) Patent No.: US 6,320,895 B1
(45) Date of Patent: Nov. 20, 2001

(54) RESONANT GALVANOMETER DRIVEN TWO DIMENSIONAL GAIN SCANNER

(75) Inventors: Michael E. Farey, Oceanside; Richard A. Chodzko, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/264,394

(22) Filed: Mar. 8, 1999

(51) Int. Cl.[7] .......................................................... H01S 3/00
(52) U.S. Cl. ............................................... 372/109; 372/55
(58) Field of Search ............................................ 372/24

(56) References Cited

U.S. PATENT DOCUMENTS

| | | |
|---|---|---|
| 3,688,215 | 8/1972 | Spencer et al. |
| 3,706,942 * | 12/1972 | Ultee ................................. 331/94.5 |
| 3,720,784 * | 3/1973 | Maydan ............................... 178/6.6 |
| 3,803,413 * | 4/1974 | Vanzetti .............................. 250/338 |
| 3,893,045 | 7/1975 | Jacobson et al. |
| 3,982,208 | 9/1976 | Camac. |
| 3,992,685 | 11/1976 | Ogren et al. |
| 4,160,218 * | 7/1979 | White ................................. 331/94.5 |
| 4,196,400 | 4/1980 | Martin. |
| 4,295,741 * | 10/1981 | Palma ................................. 356/349 |
| 4,760,582 | 7/1988 | Jeffers. |
| 4,796,265 | 1/1989 | Asada et al. |
| 5,007,691 | 4/1991 | Bobba et al. |
| 5,157,248 | 10/1992 | Barkan. |
| 5,187,612 * | 2/1993 | Plesko ................................ 359/896 |
| 5,212,570 | 5/1993 | Nacman. |
| 5,371,526 | 12/1994 | Appel et al. |
| 5,500,866 | 3/1996 | Goethals. |
| 5,677,523 | 10/1997 | Coleman. |
| 5,681,752 | 10/1997 | Prather. |
| 5,708,495 | 1/1998 | Pitz et al. |
| 6,097,021 * | 8/2000 | Aswell ............................. 250/208.1 |

OTHER PUBLICATIONS

"Zero Power Gain Measurements in CW HF (DF) Laser by Means of a Fast Scan Technique" by R.A. Chodzko, et al., ieee Journal of Quantum Electronics, vol. QE–12, No. 11, Nov., 1976 pp. 660–664.

"Multiple Line Selection in a CW HF Chemical Laser" by R.A. Chodzko, et al., Proceedings of the International Conference on Lasers 93 pp. 543–551, Lake Tahoe, Nevada, Dec. 6–9, 1993.

Abstract: "Two Dimensional Gain Measurements in a Chemical Oxygen Iodine Laser (COIL) Device", by Tate, et al, SPIE vol. 2502, pp. 272–280.

Abstract: "Hydrogen Flouride Chemical Lasers Multiple–Pass Amplifier Performance", by Waldo, et al., AIAA Journal, vol. 32, No. 1 pp. 130–136, 1994.

Abstract: "Measurements of Small Signal Coefficients of a Supersonic Flow Co Laser", by Wataru, et al, JSME International Journal, Series II, vol. 33, May 1990, pp. 272–275.

* cited by examiner

Primary Examiner—Teresa M. Arroyo
Assistant Examiner—Gioacchino Inzirillo
(74) Attorney, Agent, or Firm—Katten Muchin Zavis

(57) ABSTRACT

A system for making small signal gain measurements of a chemical laser, such as an HF or DF laser. The system is adapted to measure the two dimensional (x,y) gain distribution in real time (i.e. 30 to 40 frames per second). The system includes a resonating galvanometer driven scanning mirror which is able to tilt in both the horizontal x and vertical y direction. The scanning mirror is used for scanning the gain profile of an HF/DF probe laser. The tiltable scanning mirror with appropriate optics, allows the laser beam from the probe laser to be scanned while remaining parallel to the nozzle exit plane of the laser and thus allows the two dimensional scanning of the gain distribution in real time (i.e. at rates up to 40 frames per second). As such, the system is adapted to be controlled by a personal computer with the data stored on a hard disk drive therewithin. Another important aspect of the present invention is that the system enables the gain distribution to be measured rapidly at various wavelengths of the chemical laser.

18 Claims, 4 Drawing Sheets

RESONANT GALVANOMETER DRIVEN TWO DIMENSIONAL GAIN SCANNER

BACKGROUND OF THE INVENTION

1. Field of the Invention

The present invention relates to a system for making small signal gain measurements of a chemical laser and more particularly to a system for measuring a two dimensional gain distribution of a chemical laser in real time at rates of 30 to 40 frames per second.

2. Description of the Prior Art

Small signal gain measurements provide relatively important information for designing and scaling chemical lasers, such as high power HF and DF chemical lasers. Both HF and DF type chemical lasers are known to be chemically driven with the output power being scalable for both continuous wave (CW) and pulsed operation. Various chemical lasers are known in the art, for example, as disclosed in U.S. Pat. Nos. 3,688,215; 3,992,685; 3,623,145; 3,893,045; 3,982,208 and 4,160,218, hereby incorporated by reference. Such chemical lasers include a source of fluids, a combustion chamber and a resonator cavity. Fluids, such as hydrogen or deuterium, are mixed with another fluid for example, fluorine, and injected in a combustion chamber by way of nozzles and mixed to produce a chemical reaction. A diluent, such as helium He, may also be mixed in to control the temperature of the reaction. The chemical reaction is used to create a lasing action in the resonator cavity. In general, in such chemical lasers, the resonator cavity is disposed generally adjacent the nozzle exit plane of the combustion chamber such that the laser beams within the cavity are perpendicular to the direction of fluid flow from the nozzles.

The gain (intensity amplification per unit nozzle length) of such chemical lasers is typically measured across the resonator cavity region relative to the exit plane of the nozzles. Since the output power of chemical lasers is scalable, zero power gain measurements of such chemical lasers are normally made to facilitate selection of the parameters to provide the desired output power. Various factors are known to influence the output power of such chemical lasers. In particular, the output power of such chemical lasers is determined by the gain profile within the laser cavity, adjacent to the nozzle exit plane. The gain profile, in turn, is influenced by various factors including the gas flow rate of the fluids, the nozzle dimensions, and the pressure within the combustion chamber.

Various attempts have been made to measure the gain profile within the is laser cavity in order to design chemical lasers specific output power levels. For example, "Zero Power Gain Measurements in CW HF (DF) Laser by Means of a Fast Scan Technique" by R. A. Chodzko, et al., *IEEE Journal of Quantum Electronics* vol. QE-12, No. 11, Nov., 1976 pp. 660–664 and "Multiple Line Selection in a CW HF Chemical Laser" by R. A. Chodzko, et al., *Proceedings of the International Conference on Lasers* 93 pp. 543–551, Lake Tahoe, Nev., Dec. 6–9, 1993; both herein incorporated by reference, disclose systems for measuring the gain profile of a chemical laser. In particular, the technique disclosed in "Zero Power Gain Measurements in CW HF (DF) Laser by Means of a Fast Scan Technique" supra, relates to a relatively fast (approximately 150 microseconds) horizontal scan of the gain distribution single dimensional data of a chemical laser at a single vertical position. As used herein, a horizontal position, x relates to a position generally perpendicular to the nozzle exit plane of the combustion chamber extending across the laser cavity while the vertical position, y relates to a position parallel to the exit plane along the nozzle height. In addition, the measurements disclosed in the above mentioned reference are made at a fixed HF/DF wavelength. In "Multiple Line Selection in a CW HF Chemical Laser", supra, a rotating mirror is used for scanning the gain data. This data is stored on a magnetic disk with a digital oscilloscope with rather limited storage capability (i.e. 130 kilobytes).

Unfortunately, neither of the systems disclosed above is able to provide real time measurement (i.e. 30 to 40 frames per second) of the two dimensional (x,y) gain distribution data of a chemical laser. As such, a significant amount of laser gases (HF/DF) are wasted while calibrating the chemical lasers by these methods. In addition, neither of the systems disclosed above is able to provide gain measurements with rapid wavelength switching capability.

SUMMARY OF THE INVENTION

It is an object of the present invention to solve various problems in the prior art.

It is yet another object of the present invention to provide a system for making gain measurements of a chemical laser, such as an HF or DF chemical laser.

It is yet another object of the present invention to provide a system for making two dimensional real time measurements of the gain profile of a chemical laser.

It is a further object of the present invention to provide gain measurements of a chemical laser at multiple wavelengths.

Briefly, the present invention relates to a system for making small signal gain measurements of a chemical laser, such as an HF or DF laser. The system is adapted to measure the two dimensional (x,y) gain distribution in real time (i.e. 30 to 40 frames per second). The system includes a resonating mirror and a galvanometer driven scanning mirror which are able to tilt in both the horizontal x and vertical y direction. The scanning mirrors are used for scanning the gain profile of an HF/DF probe laser. The tiltable scanning mirror with appropriate optics allows the laser beam from the probe laser to be scanned while remaining parallel to the nozzle exit plane of the laser and thus allows the two dimensional scanning of the gain distribution in real time (i.e. at rates up to 40 frames per second). As such, the system is adapted to be controlled by a control computer with the data stored on a hard disk drive therewithin. Another important aspect of the present invention is that the system enables the gain distribution to be measured rapidly at various wavelengths of the chemical laser.

DESCRIPTION OF THE DRAWINGS

These and other objects of the present invention will be readily understood with reference to the following specification and attached drawing wherein.

DETAILED DESCRIPTION

The present invention relates to a system for making small signal gain measurements of a chemical laser in real time i.e.

30–40 frames per second. The system is applicable with various types of chemical lasers including HF and DF lasers. An example of a suitable HF/DF laser for use with the present invention is described in "Zero Power Gain Measurements in CW HF (DF) Laser by Means of a Fast Scan Technique" by R. A. Chodzko, et al., *IEEE Journal of Quantum Electronics,* vol. QE-12, No. 11, November, 1976 pp. 660–664, herein incorporated by reference. As mentioned above, the gain distribution of the chemical laser is measured across the resonator cavity relative to the nozzle exit plane of the combustion chamber. Referring to FIG. 1, as used herein, horizontal measurements are made in the x direction while vertical measurements are made in the y direction. As will be discussed in more detail below, the system in accordance with the present invention utilizes a resonating mirror and a galvanometer driven scanning mirror which enables two dimensional gain measurements to be provided in real time. As such, the acquisition of the two dimensional gain data can be implemented by way of a personal computer and off the shelf data acquisition equipment. Another important aspect of the present invention relates to providing gain data at different wavelengths. As discussed above, prior attempts in acquiring the gain data of a chemical laser are heretofore known to be done at a single wavelength and only single dimensional data is known to be acquired in real time. By providing a system for making two dimensional small signal gain measurements in real time and at different wavelengths, the amount of chemicals, i.e. HF or DF are minimized in calibrating such chemical lasers.

Figure 1A:
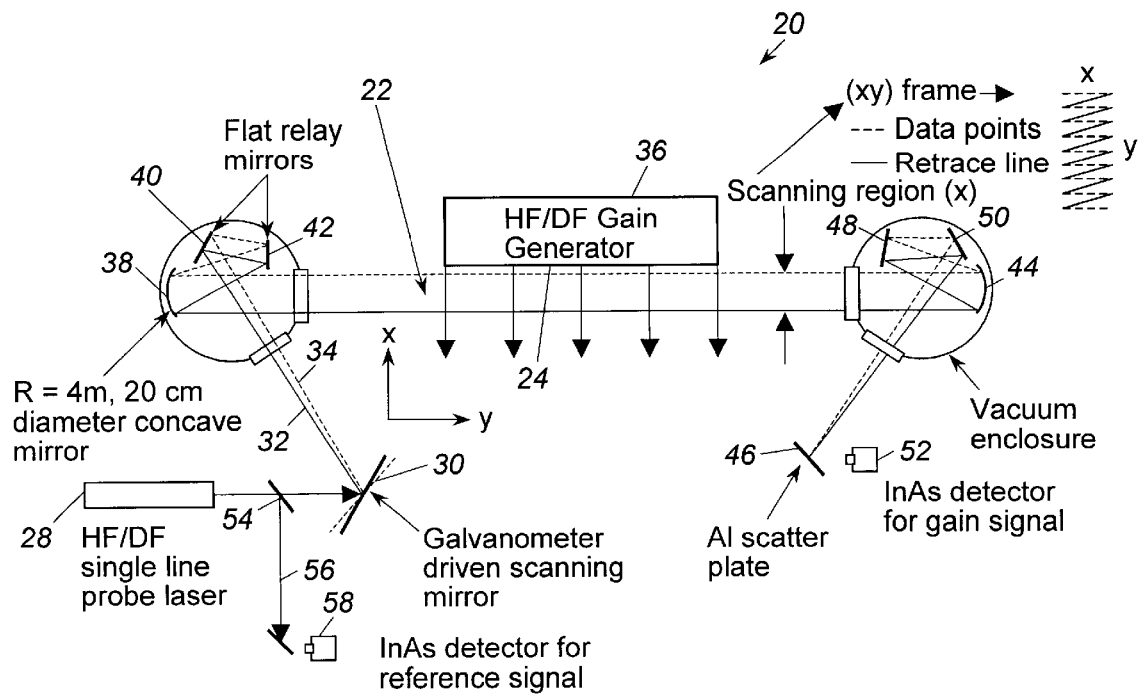
FIG 1a is a block diagram of the scanning system in accordance with the present invention, which is an exemplary view of the raster scan output from the scanner.
Figure 1B:
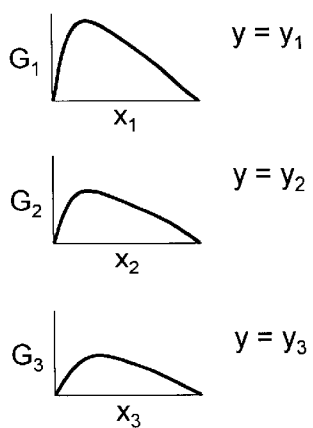
FIG. 1b is an exemplary gain distribution curve.

FIG. 1a illustrates a block diagram of the scanning system, generally identified with the reference numeral 20, in accordance with the present invention. As shown in FIG. 1a, the laser resonator cavity is generally identified by the region 22 while the nozzle exit plane is identified by the line 24. As mentioned above, the gain distribution including the zero power gain distribution is measured from the nozzle exit plane 24 across the resonator cavity 22. Exemplary gain distributions versus x at three values of y are shown in FIG. 1b. Note that a typical video frame measures 128 data points in the x direction at 128 equally spaced y positions.

Referring to FIG. 1a, the system includes a single line probe laser 28, for example an HF/DF electric discharge driven chemical laser, for example, as discussed below and illustrated in FIG. 4. The Gaussian output beam from the single line probe laser 28 is directed to a resonating galvanometer driven scanning mirror 30. As indicated by the solid 32 and dashed 34 lines, the scanning mirror system is adapted to be tilted toward the x direction as well as toward the y direction. As shown, the scanning mirror system allows the probe beam from the probe laser 28 to be scanned in the x direction while remaining parallel to the nozzle exit plane 24 of the combustion chamber or gain generator 36. The probe beam 32, 34 is directed to a concave mirror 38 by way of a pair of flat relay mirrors 40 and 42, configured such that the probe beam 32, 34 is parallel to the nozzle exit plane 24 while the probe beam 32, 34 is scanned in the x direction. The surface of the scanning mirror may be located at the focal point of the concave mirror 38 , for example, having a radius curvature of 4 m and a focal length of 2 m. The probe beam 32, 34 is directed through the resonator region 22, where the probe beam 32, 34 is amplified by the gain generator 36 to a second concave mirror 44, which, in turn, directs the probe beam 32, 34 to a scatter plate 46 by way of a pair of flat relay mirrors 48 and 50. The scatter plate 46 may be disposed at the focal length of a second concave mirror 44 having, for example, having a radius of curvature of 3 m and a focal length of 1.5 m. The amplified gain signal is measured by a detector, for example, a InAs IR detector 52. The gain for an HF gain generator is determined by measuring the amplification ratio of the probe beam 32, 34 at given reactant flow rates with the hydrogen gas on compared to the same flow with the hydrogen gas off (no gain).

A beam splitter 54 may be provided in order to sample the probe beam from the probe laser 28. The sample beam 56 may be used to measure any power variation of the probe laser 28 during the gain measurements. The sample probe beam 56 may be measured by a second detector 58, for example, an InAs detector.

The resonant galvanometer driven scanning mirror system 30 is adapted to operate, for example at 4 kilohertz. As an example, a General Scanning Inc. VSH-4 two dimensional video scanner formed from a GSI CRS 4 KHz resonant line scanner mirror (x motion) and a GSI M3H moving magnet galvanometer mirror (y motion) may be utilized. One known 4 KHz line scanner employs two oscillating torsion rods that are mechanically tuned to resonate in opposite phase. These torsional motions set up equal and opposite torques that cancel at the torsion rod attachment to the paddle mirror housing. The resonant frequency of the resonant scanning mirror 30 may be used as the clock frequency for a personal computer.

Figure 2:
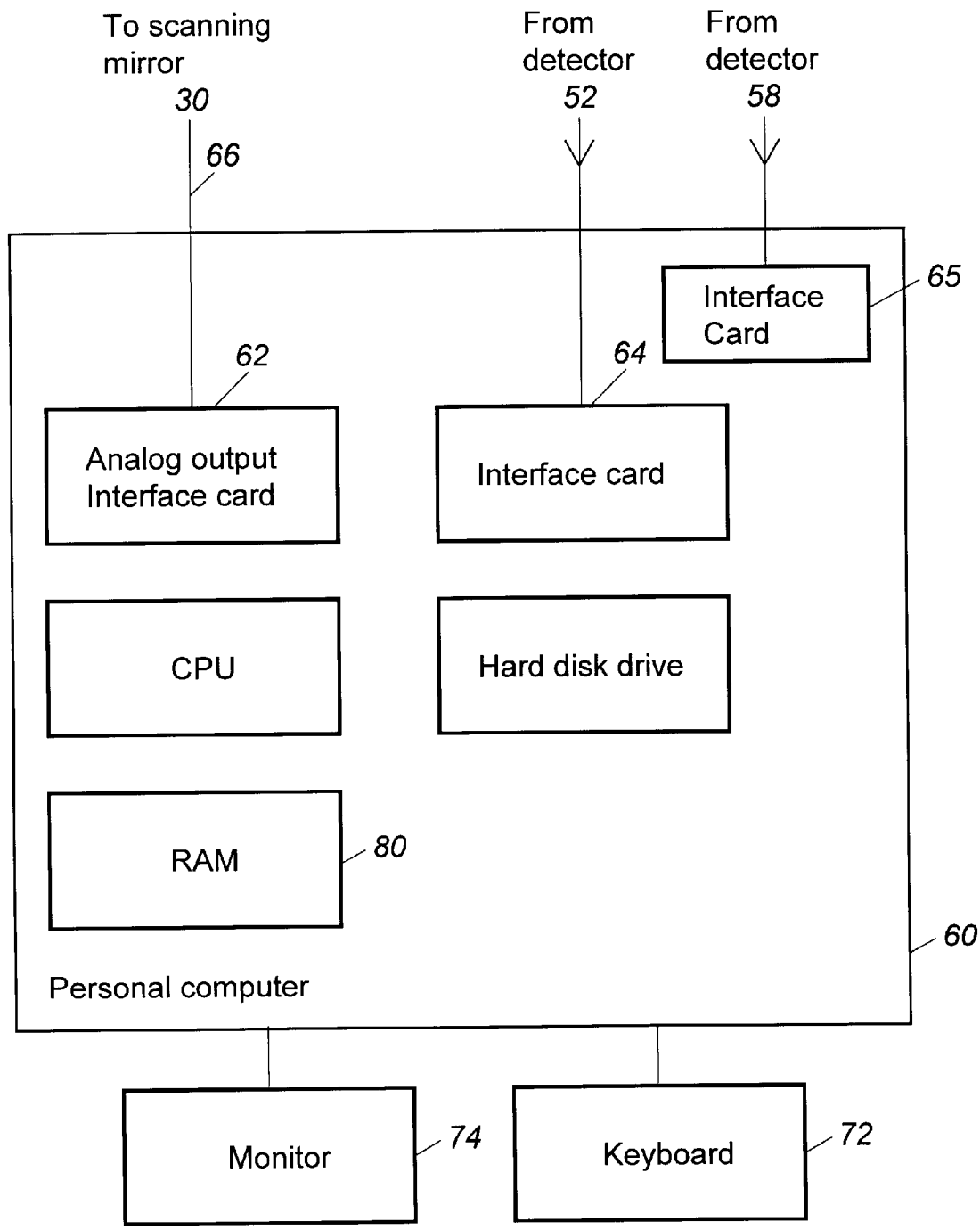
FIG. 2 is a block diagram of the computer interface used in accordance with the present invention.

Referring to FIG. 2, the control of the scanning system 20 is accomplished by a control computer 60. The following is a minimum specification for the control computer 60:

| | |
|---|---|
| Processor | 100 MHz or better, Pentium based, microprocessor |
| RAM | 16 Mbytes or better |
| Disk | 500 Mbytes or better |
| Monitor | VGA or better |
| Buss | At least 4 ISA slots available |

An important aspect of the invention is that the data acquisition and interfacing of the scanning system 20 with the personal computer 60 is accomplished with off the shelf interface cards 62 and 64. In particular, the analog output interface card 62 may be a model no. CYDDA 006 analog output interface card while the interface card 64 may be a model no. CYDAS 1802 M1-DT interface card as manufactured by CYBER Research Systems. The analog output interface card 62 is used to control the vertical scanning of the scanning mirror 30. In particular, a signal line 66 from the analog output interface card 62 is coupled to the galvanometer mirror 30 and driven at, for example a 30 to 40 HZ rate, as discussed above. The signal from the detector 52 is applied to the interface card 64 which controls the A-D data acquisition functions.

The Reference detector (58) power can be recorded on the computer 60 with a Cyber Research CYDAS 8JR interface card; a 20 Ksamples/sec. analog to digital converter card. Reference signals are taken at the end of each line scan, recording the laser power fluctuations at the 4 KHz line scan line rate.

The probe laser wavelengths can be changed between video frames using Newport Research Model 800F-HS closed loop dc motor driven linear position actuators with rotary encoders, as discussed below. A PC interface card, for example, a MM200-OPT motion controller from Newport Research Corporation can be used to control the actuators.

Figure 3:
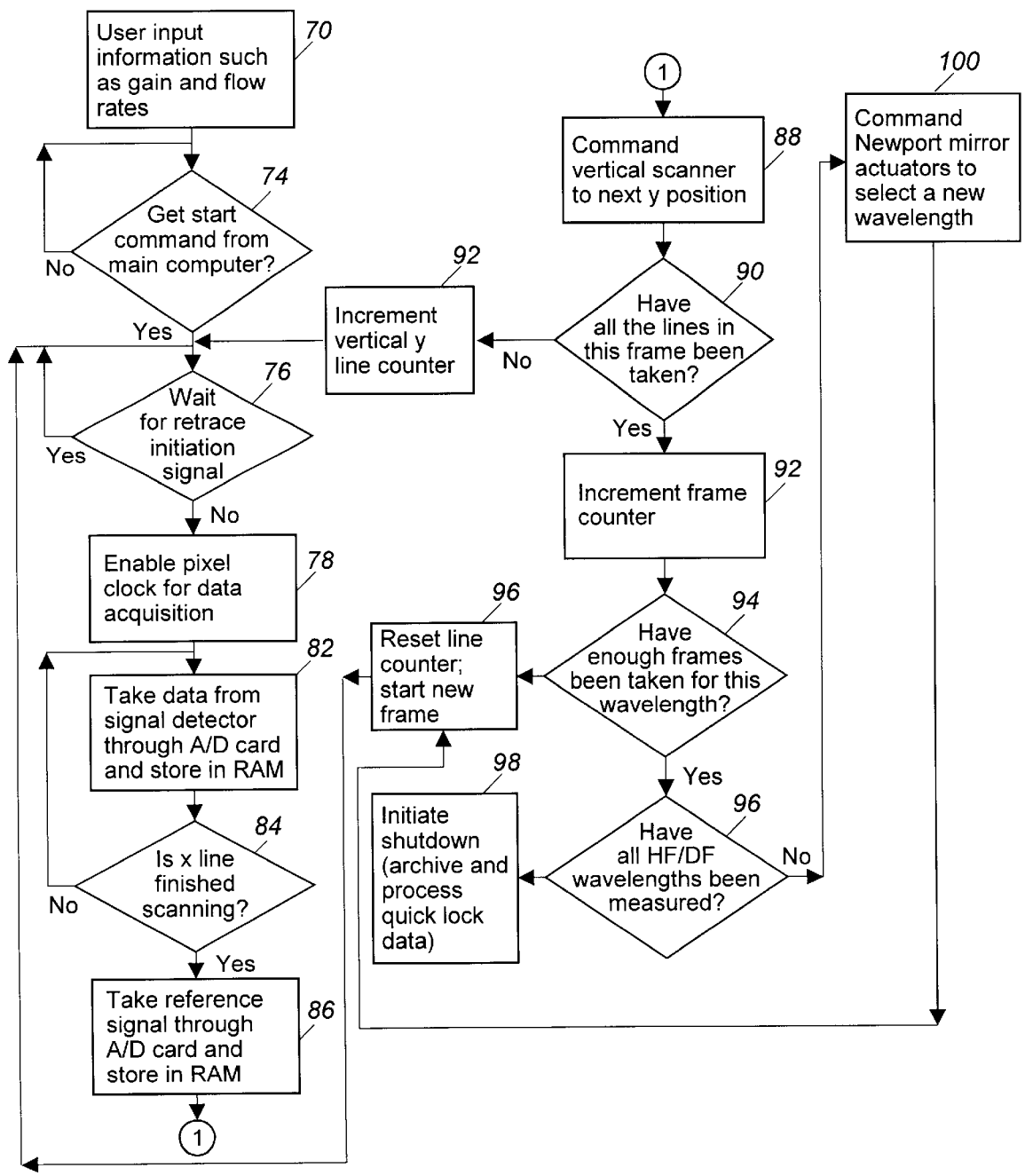
FIG. 3 is a flow diagram in accordance with the present invention.

A flow chart for the system 20 is illustrated in FIG. 3. Initially, in step 70, the x and y scan range for a single frame as well as the total number of wavelengths of the probe laser 28 for a given flow condition is input into the personal computer 60 manually by, for example, a keyboard 72. After the input information is entered, the system waits for a start command in step 74. The start command is input manually by the user to initiate the system. Once the system is initiated, the scanner 20 in accordance with the present invention provides a two dimensional output on a computer monitor 74 in a raster scan format as indicated in FIG. 1c. The raster scan output displayed on the computer monitor 74 is controlled by the video controller (not shown) within the personal computer 60. As shown in FIG. 1c, each frame consists of a plurality of x scan lines of data for a predetermined range of y positions defining a frame of the gain of the probe laser measured by the detector 52, for a single wavelength. The lines of data are generally indicated by dashed lines as well as retrace lines, indicated by solid lines. As used herein, an x scan line corresponds to the horizontal translation of an output beam parallel to the nozzle exit plane and a y position corresponds to the vertical distance of the output beam relative to the nozzle height.

Prior to the initiation of data acquisitions, the system in step 76 waits for the end of a retrace by waiting for a retrace initiation signal from the video controller. Once the retrace is complete, a pixel clock on the video controller is enabled in step 78 to initiate data acquisition of the data from the detector 52. The data is acquired and converted to digital data by way of the interface card 64 under the control of the pixel clock and stored in the computer RAM 80 in step 82. Data is continuously acquired, converted to digital format and stored in the RAM under the control of the interface card 64 until a given line is finished scanning. The system checks in step 84 to determine if the current line is finished scanning. If not, the system routes back to step 82 and continues to acquire data from the detector 52 and convert the data to digital data and store it in the computer RAM 80.

Once a particular line has been scanned, as indicated by a horizontal sync signal on the video controller, a reference signal is acquired from the reference signal detector 58, by way of a Cyber Research CYDAS 8JR analog to digital converter-card 65 and stored in the system RAM 80 in step 86. As mentioned above, reference signal may be sampled for each x scan line to determine the power variations of the probe lasers 28 during the acquisition data for each scan line. After a given horizontal or x scan line is traced, the system in step 88 commands the scanning mirror by way of the analog output interface card 62 to the next vertical or y position. The system next checks in step 90 whether all lines for a particular frame have been traced. If not, the system increments the vertical y line counter in step 92 and returns to step 76 and continues scanning x lines. If all of the lines in the frame have been scanned, a frame counter 92 is incremented in step 92.

As mentioned above, the system is able to provide data acquisition of the gain distribution in the chemical laser in real time, for example 30 to 40 frames per second. The number of frames per second is dependent upon the 4 KHz resonant line scan frequency and the required vertical scan resolution. For example, 100 vertical scan positions correspond to a 40 Hz frame rate. Thus, the system in step 94 determines if enough frames have been taken for the particular wavelength. If not, a line counter is reset in step 96 and a new frame is started. In this situation, the system control returns to step 76 to start a new frame. If a sufficient number of frames have been taken with a particular wavelength the system determines if all of the wavelengths have been measured. If so, the system is shut down in step 98 and the data is archived and stored in the hard disk drive in the personal computer. If not, the system commands the Newport actuators on the probe laser 28 in step 100 to select a new wavelength.

Figure 4:
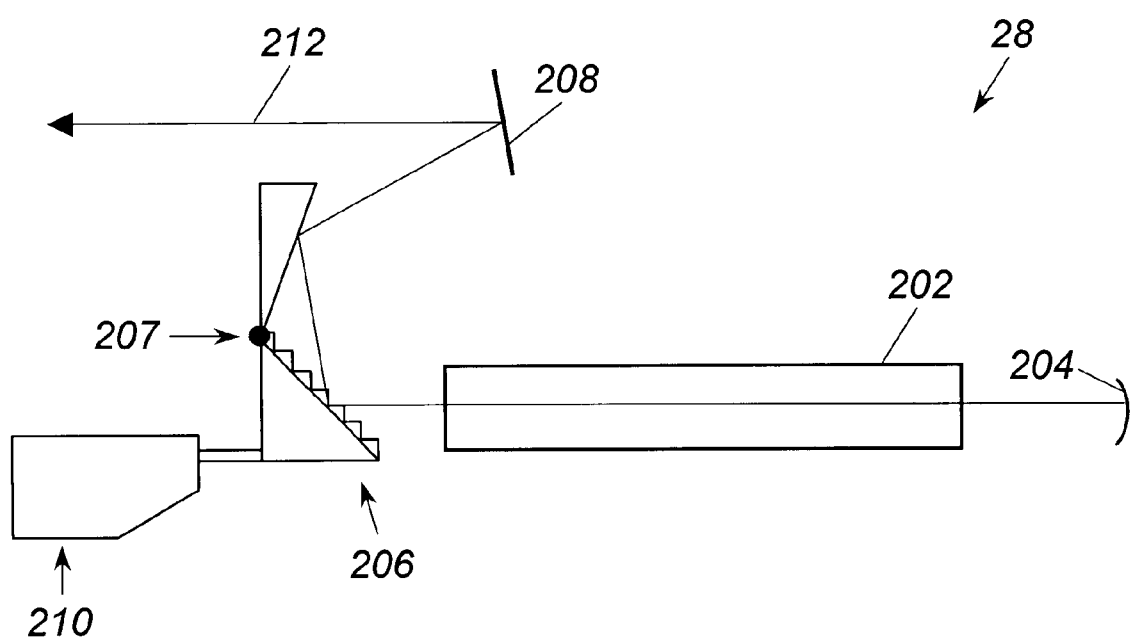
FIG. 4 is block diagram of an exemplary probe laser for use with the present invention.

As discussed above, the HF/DF probe laser may be as shown in FIG. 4. The Hellios CL2 HF/DF probe laser may be driven by an electric discharge tube with a $TEM_{00}$ stable optical cavity consisting of a diffraction grating for wavelength selection and a concave mirror.

The laser 28 includes a Hellios CL2 electric discharge driven HF gain cell 202, a concave mirror 204 to form a probe laser stable cavity, an HF/DF diffraction grating /flat mirror mount 206 for a single line mounted for pivotal movement about an axis of rotation 20 a flat mirror relay 208 and a Newport actuator 210 for wavelength switching for providing a single line $TEM_{00}$ output beam 212 with a fixed direction/position for each wavelength. The grating 206 is mounted in order to produce a zero order Gaussian output beam that maintains a constant direction and position for every wavelength selected. The wavelengths are selected by varying the tilt angle of the grating 206 by way of a closed loop Newport 800F-HS actuator 210 controlled by the control computer 60 as discussed above.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A system for making small signal gain measurements of a chemical laser having a gain generator which defines a nozzle exit plane, the system comprising:

a probe laser for generating an output beam;

a scanning mirror for scanning the output beam of said probe laser, said scanning mirror tiltable toward a y-axis parallel to said nozzle exit plane and tiltable toward an x-axis, per pendicular to said nozzle exit plane, defining a plurality of x scan lines corresponding to output beams per pendicular to said nozzle exit plane at a corresponding plurality of y positions, said y positions representing the distance of said output beam relative to said nozzle height;

first and second mirrors spaced apart mirrors defining a resonator region for amplifying said output beam, said gain generator disposed adjacent said resonator region;

an optical system for directing the output beam from said scanning mirror to a detector and maintaining the probe beam parallel to said nozzle exit plane, a detector for measuring the amplified probe beam at a selected wavelengths;

means for storing data from said detector for each x scan line at a y position; and means for controlling said scanning mirror in order to vary the y positions of said x scan lines until an entire frame has been scanned.

2. The system as recited in claim 1, wherein said chemical laser is an HF chemical laser.

3. The system as recited in claim 1, wherein said chemical laser is a DF laser.

4. The system as recited in claim 1, wherein said probe laser has a plurality of selectable wavelengths.

5. The system as recited in claim 1, wherein said probe laser includes a diffraction grating for wavelength selection and means for selecting a wavelength.

6. The system as recited in claim 4, further including means for automatically varying the wavelength of said probe beam.

7. The system as recited in claim 4, further including means for displaying said data.

8. The system as recited in claim 4, further including means for varying the wavelength of said probe laser.

9. The system as recited in claim 6, wherein said system includes means for resetting the frame for each wavelength selected.

10. The system as recited in claim 7, wherein said displaying means includes means for displaying said data in a raster scan format.

11. The system as recited in claim 8, wherein said varying means varies said wavelength after a frame has been scanned.

12. The system as recited in claim 11, wherein said controlling means includes a resonant galvanometer drive.

13. A system for making small signal gain measurement of chemical laser having a gain generator having a gain galvanometer which defines a nozzle exit plane, the system comprising:

a probe laser for generating an output beam;

an optical system for causing said output beam to be generally parallel to said nozzle exit planes defining an x scan line, the vertical position of said x scan line relative to said nozzle exit plane defining y position;

a first detector for detecting the gain of said x scan lines defining data;

a memory for storing said data; and a control system for varying the y position of said x scan lines in order to cause an entire frame of data to be stored.

14. The system as recited in claim 13, wherein in said control system includes a resonant scan mirror and a galvanometer driven scan mirror.

15. The system as recited in claim 13 further including means for measuring power variation of said probe laser.

16. The system as recited in claim 14, wherein said probe laser includes a first reactant and a second reactant, said data being stored as a function of ratio of said first reactant compared to said first reactant off.

17. The system as recited in claim 14, wherein said first reactant is deuterium.

18. The system as recited in claim 16, wherein said first reactant is hydrogen.

\* \* \* \* \*